US012769341B2

(12) United States Patent
Pellerin

(10) Patent No.: US 12,769,341 B2
(45) Date of Patent: Oct. 20, 2026

(54) REGULATING VALVE FOR AN OIL SYSTEM

(71) Applicant: Pratt & Whitney Canada Corp., Longueuil (CA)

(72) Inventor: Hugues Pellerin, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/764,997

(22) Filed: Jul. 5, 2024

(65) Prior Publication Data

US 2026/0010184 A1 Jan. 8, 2026

(51) Int. Cl.

*G05D 16/10* (2006.01)
*B64D 27/10* (2006.01)
*F02C 7/06* (2006.01)

(52) U.S. Cl.

CPC ............. *G05D 16/103* (2013.01); *F02C 7/06* (2013.01); *B64D 27/10* (2013.01); *F05D 2260/98* (2013.01); *Y10T 137/7905* (2015.04)

(58) Field of Classification Search

CPC .......... B64D 27/10; F02C 7/06; F04B 49/035; F05D 2260/98; F16K 17/044

See application file for complete search history.

(56) References Cited

U.S. PATENT DOCUMENTS 2,518,387 A * 8/1950 Shaw .................... F16K 17/044 267/136
2,619,115 A * 11/1952 Dondero ................. F16K 17/04 137/543
2,858,842 A * 11/1958 Reis ...................... F04B 49/035 137/115.26
4,189,095 A * 2/1980 Monigold ............... F01P 7/044 236/92 R
6,168,091 B1 1/2001 Rodier
6,993,904 B2 2/2006 Hazzard
11,192,407 B2 * 12/2021 Cervantez ............ G05D 16/185

(Continued)

FOREIGN PATENT DOCUMENTS

CN 111237535 B 8/2023
GB 747667 A 4/1956
RU 2755448 C1 9/2021

OTHER PUBLICATIONS

EP Search Report for EP Patent Application No. 25187397.2 dated Dec. 3, 2025.

*Primary Examiner* — Robert K Arundale
(74) *Attorney, Agent, or Firm* — Getz Balich LLC

(57) ABSTRACT

A regulating valve includes a housing, a piston, a spring disk, an outer cover, a plunger, a first spring, and a second spring along a valve axis. The housing forms a valve inlet and a valve outlet. The piston is disposed within the housing at the valve inlet. The piston forms a first cavity. The spring disk is disposed within the piston and further forms the first cavity. The outer cover forms a second cavity axially between the outer cover and the spring disk. The plunger is disposed at the outer cover. The plunger extends along the valve axis between and to a first axial plunger end and a second axial plunger end. The first axial plunger end is disposed within the second cavity. The first spring extends axially between and contacts the spring disk and the piston. The second spring extends axially between and contacts the spring disk and the outer cover.

20 Claims, 13 Drawing Sheets

(56) References Cited

U.S. PATENT DOCUMENTS

| | | | | |
|---|---|---|---|---|
| 11,371,436 | B2 | 6/2022 | Legare | |
| 2010/0187451 | A1 | 7/2010 | Vinski | |
| 2016/0369694 | A1 | 12/2016 | Faubert | |
| 2020/0200165 | A1 * | 6/2020 | Zediu | F16K 31/602 |

* cited by examiner

REGULATING VALVE FOR AN OIL SYSTEM

TECHNICAL FIELD

This disclosure relates to a regulating valve for an oil system of a gas turbine engine for an aircraft propulsion system.

BACKGROUND OF THE ART

Propulsion systems for aircraft may typically include rotational equipment configured for facilitating aircraft propulsion, generating electrical power, and/or other functions of aircraft operation. In many cases, rotational equipment may require lubrication and/or cooling, for example, using one or more oil systems to distribute oil to the rotational equipment and/or other oil loads. Various oil systems are known in the art. While these known systems may be useful for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a regulating valve for an oil system of a gas turbine engine includes a housing, a piston, a spring disk, an outer cover, a plunger, a first spring, and a second spring. The housing forms a valve inlet and a valve outlet. The valve inlet extends axially through the housing along a valve axis of the regulating valve. The valve outlet extends radially through the housing. The piston is disposed within the housing. The piston includes a plug portion and a piston sidewall portion. The plug portion is disposed on the valve axis at the valve inlet. The piston sidewall portion extends circumferentially about the valve axis. The piston sidewall portion includes an inner radial piston side surrounding and forming a first cavity. The spring disk is disposed at the inner radial piston side. The spring disk extends between and to a first axial disk end and a second axial disk end. The first axial disk end further forms the first cavity. The outer cover forms a second cavity axially between the outer cover and the second axial disk end. The plunger is disposed at the outer cover. The plunger extends along the valve axis between and to a first axial plunger end and a second axial plunger end. The first axial plunger end is disposed within the second cavity. The first spring is disposed within the first cavity. The first spring extends axially between and contacts the first axial disk end and the plug portion. The second spring is disposed within the second cavity. The second spring extends axially between and contacts the second axial disk end and the outer cover.

In any of the aspects or embodiments described above and herein, the plug portion may form one or more bleed holes. The one or more bleed holes may connect the first cavity in fluid communication with the valve outlet.

In any of the aspects or embodiments described above and herein, the housing may form a bleed line extending between and to the second cavity and the valve outlet. The bleed line may connect the second cavity in fluid communication with the valve outlet.

In any of the aspects or embodiments described above and herein, the housing may include an inner radial housing side extending circumferentially about the valve axis. The piston sidewall portion may be disposed at the inner radial housing side.

In any of the aspects or embodiments described above and herein, the spring disk may be axially translatable relative to piston.

In any of the aspects or embodiments described above and herein, the outer cover may form a first plunger aperture extending through the outer cover along the valve axis. The outer cover may form a first threaded interface circumscribing the first plunger aperture. The plunger may form a second threaded interface. The first threaded interface may be engaged with the second threaded interface.

In any of the aspects or embodiments described above and herein, the outer cover and the plunger may form a unitary component.

In any of the aspects or embodiments described above and herein, the spring disk may form one or more bleed holes extending through the spring disk from the first axial disk end to the second axial disk end. The one or more bleed holes may connect the first cavity and the second cavity in fluid communication.

In any of the aspects or embodiments described above and herein, the spring disk may have a non-uniform thickness extending between and to the first axial disk end and the second axial disk end.

In any of the aspects or embodiments described above and herein, the spring disk may form a first annular groove at the first axial disk end and a second annular groove at the second axial disk end.

In any of the aspects or embodiments described above and herein, the first spring may have a greater spring stiffness than the second spring.

In any of the aspects or embodiments described above and herein, the regulating valve may further include a sleeve extending between and to a first axial sleeve end and a second axial sleeve end. The sleeve may include an inner radial sleeve side and an outer radial sleeve side. The inner radial sleeve side and the outer radial sleeve side may extend circumferentially about the valve axis. The sleeve may form a sleeve inlet through the first axial sleeve end at the valve inlet. The sleeve may form a sleeve outlet extending through the inner radial side and the outer radial side at the valve outlet. The inner radial sleeve side may further form the second cavity. The piston may be disposed within the sleeve with the plug portion disposed at the sleeve inlet.

In any of the aspects or embodiments described above and herein, the sleeve may form one or more bleed holes extending through the sleeve from the inner radial sleeve side to the outer radial sleeve side. The one or more bleed holes may connect the second cavity and the valve outlet in fluid communication.

In any of the aspects or embodiments described above and herein, the sleeve may form a first flange at the second axial sleeve end. The outer cover may form a second flange mounted to the first flange. The first flange and the second flange may be mounted to the housing.

In any of the aspects or embodiments described above and herein, each of the first flange and the second flange may include a first fastener aperture and a second fastener aperture. The first fastener aperture and the second fastener aperture may be positioned on a plane offset from the valve axis.

In any of the aspects or embodiments described above and herein, the regulating valve may further include an inner cover mounted within the outer cover. The inner cover may form a plunger aperture. The inner cover may form a first anti-rotation mating interface at the plunger aperture. The second axial plunger end may be disposed within the inner cover. The plunger may form a second anti-rotation mating interface. The first anti-rotation mating interface may be engaged with the second anti-rotation mating interface.

In any of the aspects or embodiments described above and herein, the outer cover may form a first anti-rotation mating interface. The inner cover may form a second anti-rotation mating interface. The first anti-rotation mating interface may be engaged with the second anti-rotation mating interface.

In any of the aspects or embodiments described above and herein, the regulating valve may further include a positioning assembly. The positioning assembly may include a positioning member and a plurality of adjustment washers. The plunger may form the positioning member. The plurality of adjustments washers may include at least one first adjustment washer on a first axial side of the positioning member and at least one second adjustment washer on a second axial side of the positioning member. The positioning member and the plurality of adjustment washers may be axially positioned between the outer cover and the inner cover.

According to another aspect of the present disclosure, a regulating valve for an oil system of a gas turbine engine includes a housing, a piston, a spring disk, an outer cover, a plunger, a first spring, and a second spring. The housing forms a valve inlet and a valve outlet. The piston is disposed within the housing. The piston includes a plug portion and a piston sidewall portion. The plug portion is disposed on a valve axis of the regulating valve at the valve inlet. The piston sidewall portion extends circumferentially about the valve axis. The piston sidewall portion includes an inner radial piston side surrounding and forming a first cavity. The spring disk is disposed at the inner radial piston side. The spring disk extends between and to a first axial disk end and a second axial disk end. The first axial disk end further forms the first cavity. The spring disk is axially translatable relative to piston. The outer cover forms a second cavity axially between the outer cover and the second axial disk end. The plunger is connected to the outer cover. The plunger is disposed within the second cavity. The first spring is disposed within the first cavity. The first spring extends axially between and contacts the first axial disk end and the plug portion. The second spring is disposed within the second cavity. The second spring extends axially between and contacts the second axial disk end and the outer cover. The piston is positionable in a first axial position, a second axial position, and a third axial position within the housing to sequentially increase a variable flow area at the valve inlet. In the first axial position the plug portion obstructs oil flow from the valve inlet to the valve outlet and the spring disk is axially spaced from the plunger. In the second axial position the spring disk contacts the plunger. In the third axial position the piston contacts the outer cover.

According to another aspect of the present disclosure, an oil system for a gas turbine engine includes an oil pump and a regulating valve. The oil pump includes a pump inlet and a pump outlet. The regulating valve includes a valve inlet and a valve outlet. The valve inlet is connected in fluid communication with the oil pump at the pump outlet. The valve outlet is connected in fluid communication with the oil pump at the pump inlet. The regulating valve extends along a valve axis. The regulating valve includes a housing, a piston, a spring disk, an outer cover, a plunger, a first spring, and a second spring. The housing forms the valve inlet and the valve outlet. The piston is disposed within the housing. The piston includes a plug portion and a piston sidewall portion. The plug portion is disposed at the valve inlet. The piston sidewall portion extends circumferentially about the valve axis. The piston sidewall portion includes an inner radial piston side surrounding and forming a first cavity. The spring disk is disposed at the inner radial piston side. The spring disk extends between and to a first axial disk end and a second axial disk end. The first axial disk end further forms the first cavity. The outer cover forms a second cavity axially between the outer cover and the second axial disk end. The plunger is disposed at the outer cover. The plunger extends along the valve axis between and to a first axial plunger end and a second axial plunger end. The first axial plunger end is disposed within the second cavity. The first spring is disposed within the first cavity. The first spring extends axially between and contacts the first axial disk end and the plug portion. The second spring is disposed within the second cavity. The second spring extends axially between and contacts the second axial disk end and the outer cover.

The present disclosure, and all its aspects, embodiments and advantages associated therewith will become more readily apparent in view of the detailed description provided below, including the accompanying drawings.

DETAILED DESCRIPTION

Figure 1:
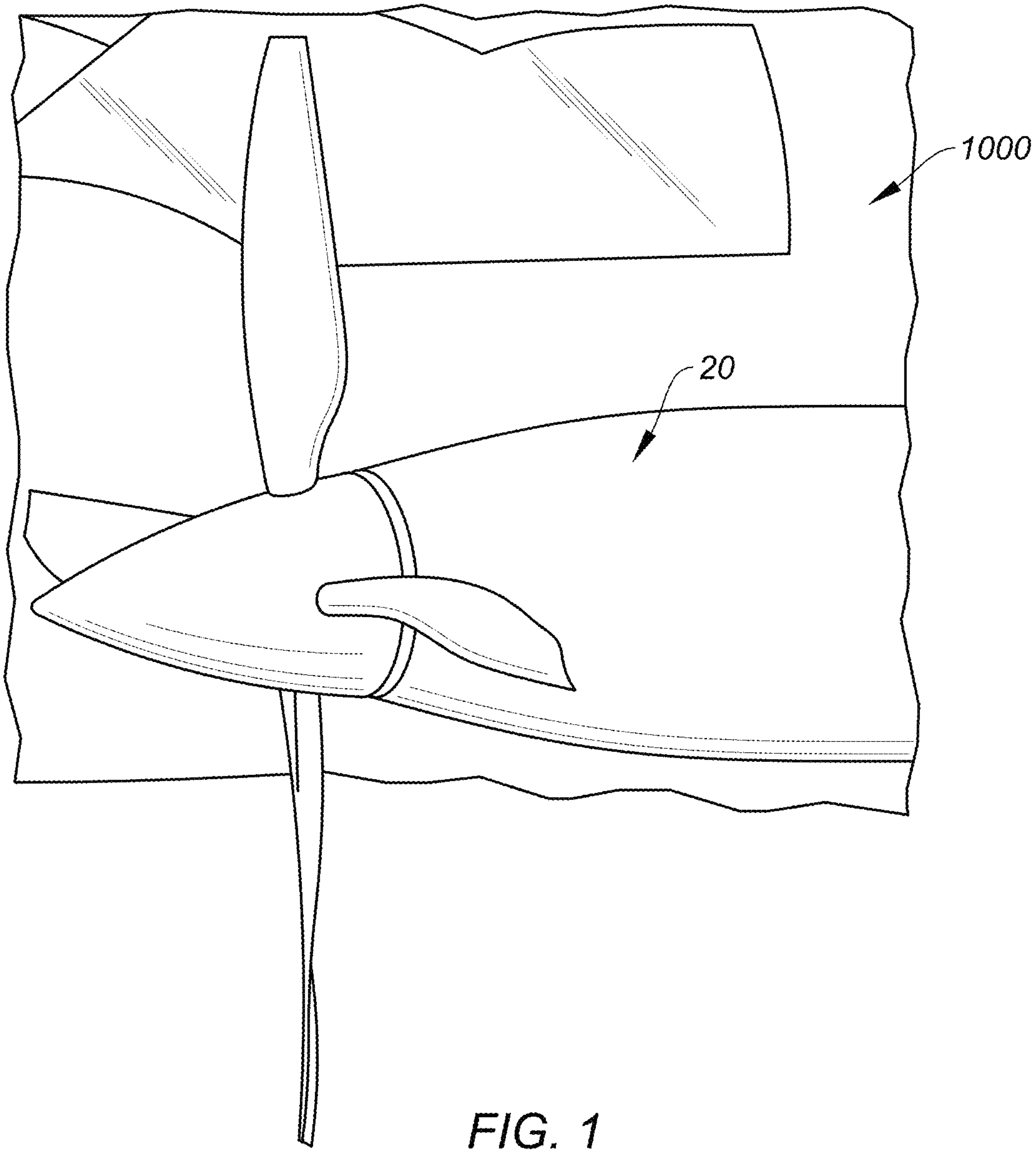
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
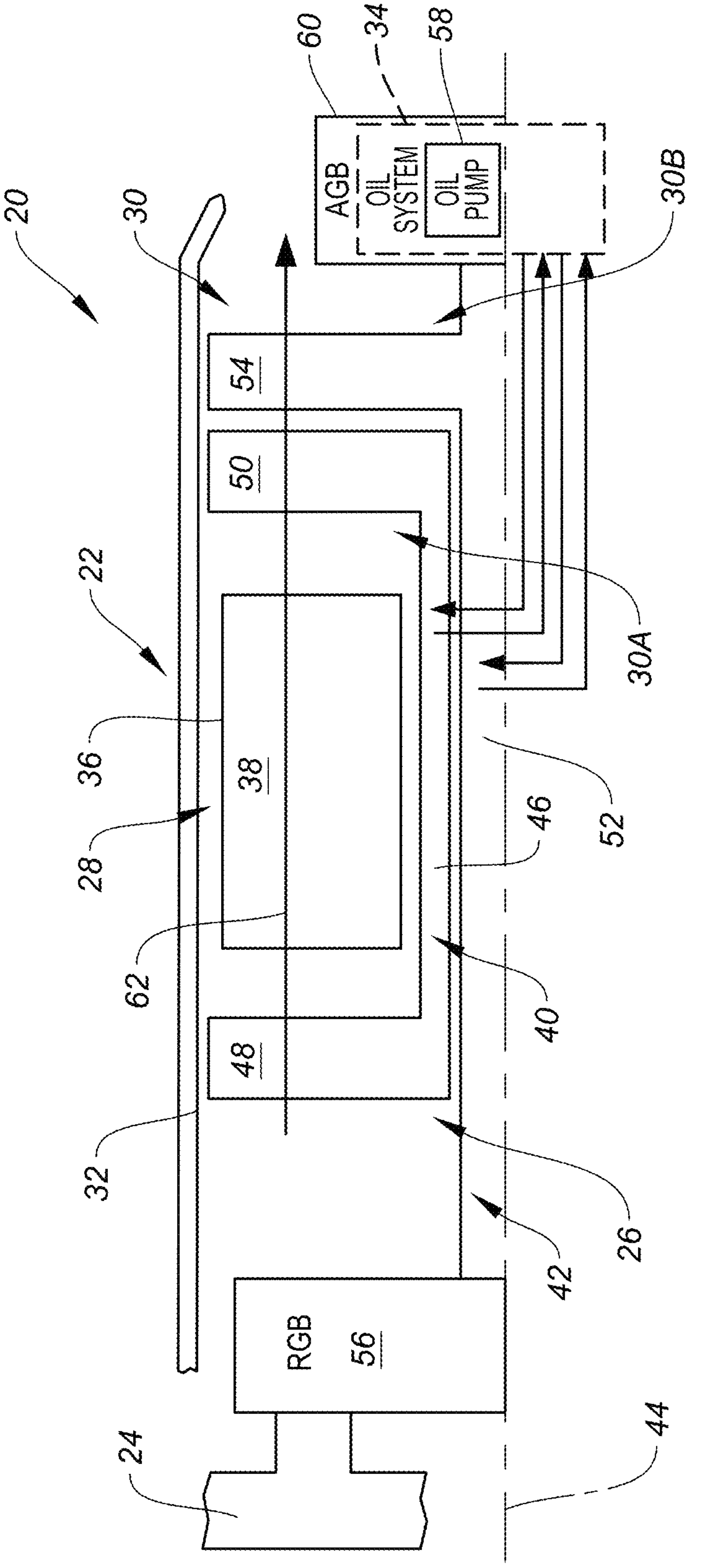
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes a gas turbine engine 22 and a propulsor 24. The gas turbine engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Moreover, the present disclosure is not limited to propulsion systems including a gas turbine engine. For example, the propulsion system 20 may alternatively include an intermittent combustion engine such as, but not limited to, a rotary engine (e.g., a Wankel engine), a piston engine, or the like.

The gas turbine engine 22 of FIG. 2 includes a compressor section 26, a combustor section 28, a turbine section 30, an engine static structure 32, and an oil system 34. The combustor section 28 includes a combustor 36 (e.g., an annular combustor). The combustor 36 forms a combustion chamber 38. The turbine section 30 includes a high-pressure turbine section 30A and a power turbine section 30B.

Components of the compressor section 26 and the turbine section 30 of FIG. 2 form a first rotational assembly 40 (e.g., a high-pressure spool) and a second rotational assembly 42 of the gas turbine engine 22. The first rotational assembly 40 and the second rotational assembly 42 are mounted for rotation about a rotational axis 44 (e.g., an axial centerline) of the gas turbine engine 22 relative to the engine static structure 32.

The first rotational assembly 40 includes a first shaft 46, a bladed compressor rotor 48 for the compressor section 26, and a bladed turbine rotor 50 for the high-pressure turbine section 30A. The first shaft 46 interconnects the bladed compressor rotor 48 and the bladed turbine rotor 50.

The second rotational assembly 42 includes a second shaft 52 and a bladed power turbine rotor 54 for the power turbine section 30B. The second shaft 52 is connected to the bladed power turbine rotor 54. The second shaft 52 operably connects (e.g., directly or indirectly connects) the bladed power turbine rotor 54 with the propulsor 24.

The engine static structure 32 includes engine casings, cowlings, and other fixed (e.g., non-rotating) structures of the gas turbine engine 22 which house and/or support components of the gas turbine engine 22 such as, but not limited to, those of the compressor section 26, the combustor section 28, and the turbine section 30. The engine static structure 32 includes one or more bearing assemblies and/or gear trains configured to rotationally support and/or interconnect components of the first rotational assembly 40 and the second rotational assembly 42. The engine static structure 32 of FIG. 2 includes a gear box 56 (e.g., a reduction gear box (RGB)) coupling the second shaft 52 and the propulsor 24. The gear box 56 includes a gear assembly (e.g., an epicyclic gear assembly) coupling the second shaft 52 and the propulsor 24. The gear assembly may be a reduction gear assembly configured to drive rotation of the propulsor 24 at a reduced rotational speed relative to the second shaft 52. Of course, the second shaft 52 may alternatively be directly connected to the propulsor 24 to drive the propulsor 24 at the same rotational speed as the second shaft 52.

The oil system 34 is configured to supply oil for cooling and/or lubrication of gas turbine engine 22 components. For example, the oil system 34 may supply oil for one or more bearing assemblies of the engine static structure 32 which rotationally support the first rotational assembly 40 and the second rotational assembly 42. The oil system 34 may additionally supply oil for the gear box 56 and/or the accessory gear box 60. The oil system 34 includes at least one oil pump 58 configured to direct (e.g., pump) oil through the oil system 34. The oil pump 58 of FIG. 2 is rotationally driven by an accessory gear box (AGB) 60 of the engine static structure 32. The accessory gear box 60 includes a gear assembly (e.g., an epicyclic gear assembly) coupling the second shaft 52 and the oil pump 58. The accessory gear box 60 may additionally facilitate operation of one or more rotational loads such as, but not limited to, an electrical generator, a hydraulic pump, an air compressor, or the like.

During operation of the propulsion system 20 of FIG. 2, ambient air enters the propulsion system 20 through an air intake into and through a core flow path 62 of the gas turbine engine 22. The ambient air flow along the core flow path 62 is compressed in the compressor section 26 and directed into the combustion chamber 38 of the combustor 36 within the combustor section 28. Fuel is injected into the combustion chamber 38 and mixed with the compressed air to provide a fuel-air mixture. This fuel-air mixture is ignited, and combustion products thereof flow through the high-pressure turbine section 30A and the power turbine section 30B, and are exhausted from the propulsion system 20. The bladed turbine rotor 50 and the bladed power turbine rotor 54 rotationally drive the first rotational assembly 40 and the second rotational assembly 42, respectively, in response to the combustion gas flow through the high-pressure turbine section 30A and the power turbine section 30B. The second rotational assembly 42 (e.g., the second shaft 52) may drive rotation of the propulsor 24, for example, through the gear box 56.

Figure 3:
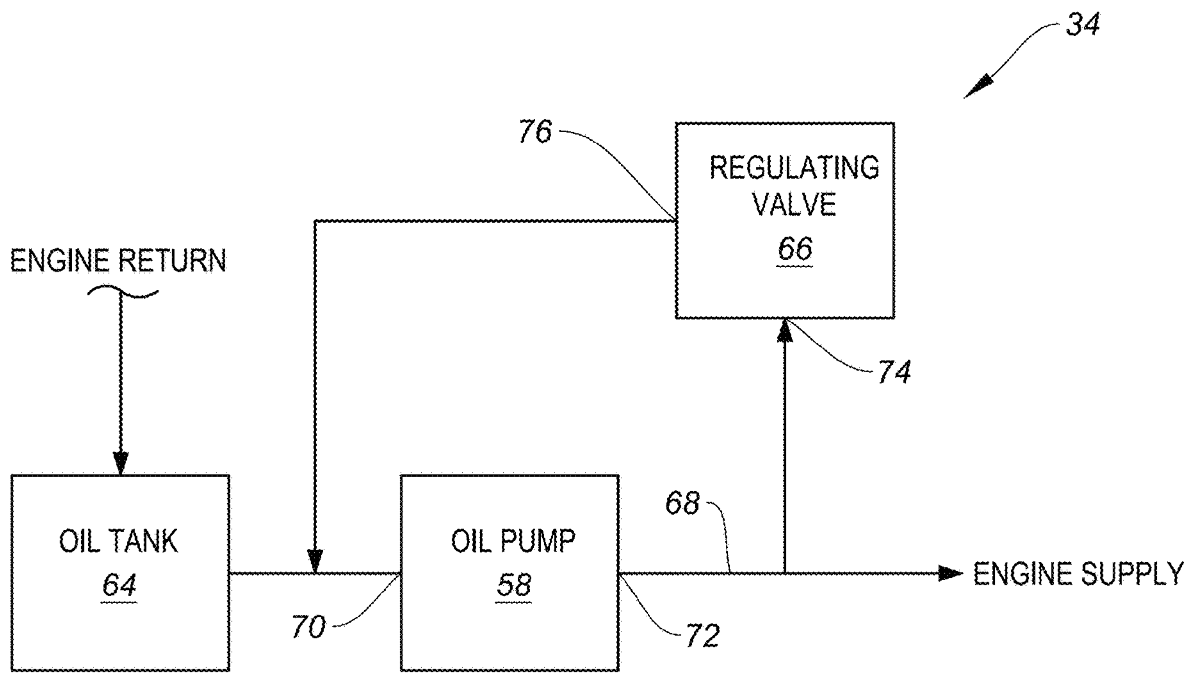
FIG. 3 schematically illustrates an oil system for a gas turbine engine of an aircraft propulsion system, in accordance with one or more embodiments of the present disclosure.

FIG. 3 schematically illustrates the oil system 34. The oil system 34 of FIG. 3 includes the oil pump 58, an oil tank 64, a regulating valve 66, and an oil flow path 68. Components of the oil system 34, including the oil pump 58, the oil tank 64, and the regulating valve 66 may be connected in fluid communication by any suitable conduit (e.g., pipe, tube, hose, etc.) to form the oil flow path 68. The oil system 34 may include one or more additional components such as, but not limited to, valves, heat exchangers, filters, scavenge pumps, and the like, and the present disclosure is not limited to the foregoing exemplary configuration of the oil system 34 shown in FIG. 3.

The oil pump 58 includes a pump inlet 70 and a pump outlet 72. The pump inlet 70 is connected in fluid communication with the oil tank 64. The oil pump 58 is configured to direct (e.g., pump) oil from the oil tank 64 to the pump outlet 72 and subsequently supplied to oil loads of the gas turbine engine 22 (see FIG. 2). The regulating valve 66 includes a valve inlet 74 and a valve outlet 76. The valve inlet 74 is connected in fluid communication with the oil pump 58 at (e.g., on, adjacent, or proximate) the pump outlet 72 (e.g., downstream of the pump outlet 72). The valve outlet 76 is connected in fluid communication with the oil pump 58 at (e.g., on, adjacent, or proximate) the pump inlet 70 (e.g., upstream of the pump inlet 70). The regulating valve 66 is configured to selectively direct and recirculate oil from the pump outlet 72 to the pump inlet 70, as will be discussed in further detail. Oil from the oil loads of the gas turbine engine 22 may be returned to the oil tank 64 for further use by the oil system 34.

Figure 4:
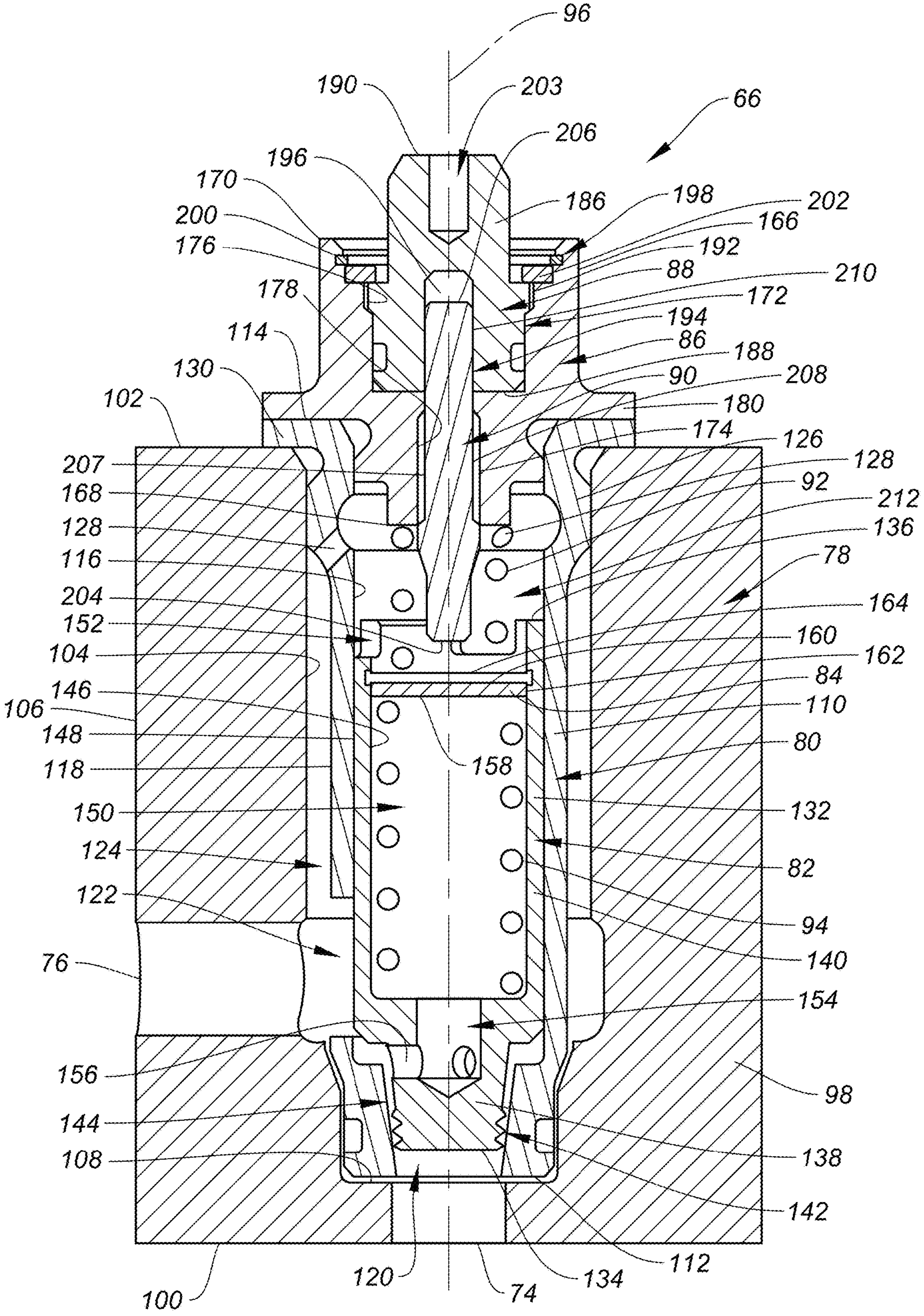
FIG. 4 illustrates a cutaway, side view of a regulating valve for an oil system, in accordance with one or more embodiments of the present disclosure.
Figure 5:
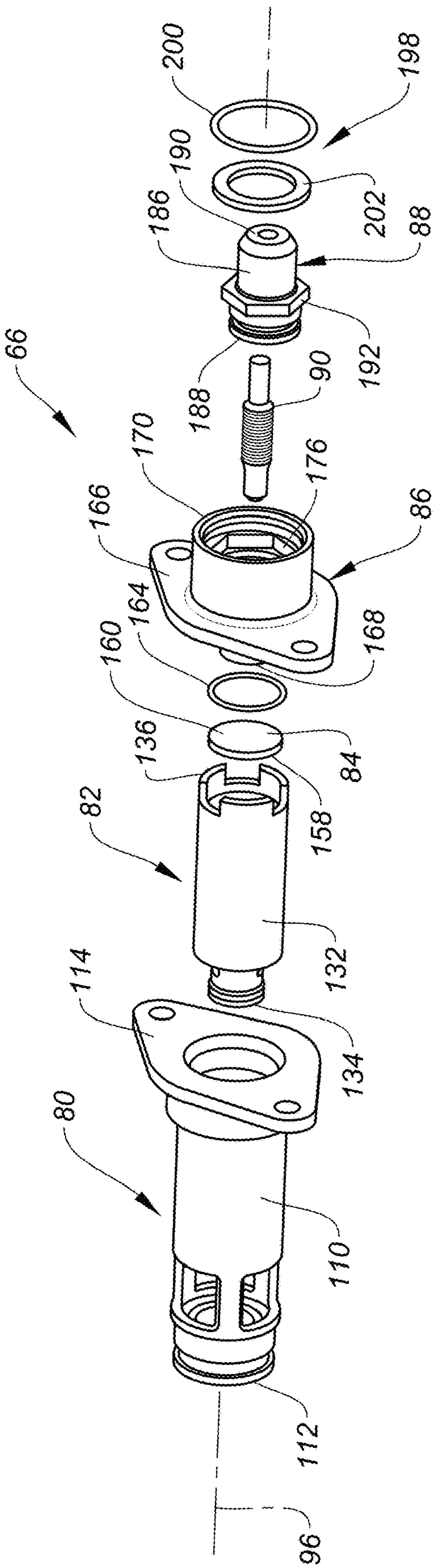
FIG. 5 illustrates an exploded view of components of the regulating valve of FIG. 4, in accordance with one or more embodiments of the present disclosure.

FIGS. 4 and 5 illustrate the regulating valve 66 in greater detail. FIG. 4 illustrates a cutaway view of the regulating valve 66. FIG. 5 illustrates an exploded view of the regulating valve 66. The regulating valve 66 includes a housing 78, a sleeve 80, a piston 82, a spring disk 84, an outer cover 86, an inner cover 88, a plunger 90, a check valve spring 92, and a cold-start spring 94 along a valve axis 96 (e.g., a centerline axis) of the regulating valve 66.

The housing 78 includes a housing body 98. The housing body 98 extends circumferentially about (e.g., completely around) the valve axis 96. The housing body 98 extends (e.g., axially extends) between and to a first axial end 100 of the housing body 98 and a second axial end 102 of the housing body 98. The housing body 98 forms the valve inlet 74 on the first axial end 100 along the valve axis 96. The housing body 98 extends (e.g., radially extends) between and to an inner radial side 104 of the housing body 98 and an outer radial side 106 of the housing body 98. The inner radial side 104 extends circumferentially about (e.g., completely around) the valve axis 96. The housing body 98 may form an annular sleeve facing surface 108 extending (e.g., radially extending) between and to the valve inlet 74 and the inner radial side 104. The valve inlet 74 may extend (e.g., axially extend) between and to the first axial end 100 and the sleeve facing surface 108. The inner radial side 104 may extend (e.g., axially extend) between and to the sleeve facing surface 108 and the second axial end 102. The housing body 98 forms the valve outlet 76 extending (e.g., radially extending) between and to the inner radial side 104 and the outer radial side 106.

The sleeve 80 includes a sleeve body 110. The sleeve body 110 extends (e.g., axially extends) between and to a first axial end 112 of the sleeve body 110 and a second axial end 114 of the sleeve body 110. The sleeve body 110 extends (e.g., radially extends) between and to an inner radial side 116 of the sleeve body 110 and an outer radial side 118 of the sleeve body 110. The inner radial side 116 and the outer radial side 118 extend circumferentially about (e.g., completely around) the valve axis 96. The inner radial side 116 surrounds and forms a sleeve inlet 120 of the sleeve 80 through the first axial end 112. The sleeve inlet 120 extends (e.g., axially extends) through the sleeve body 110 along the valve axis 96. The sleeve inlet 120 may have a frustoconical shape which radially expands in an axial direction from the first axial end 112 toward the second axial end 114. The sleeve body 110 forms a sleeve outlet 122 of the sleeve 80 extending (e.g., radially extending) through the sleeve body 110 from the inner radial side 116 to the outer radial side 118. The sleeve outlet 122 may include one or a plurality of discrete openings (e.g., a rectangular opening, a circular opening, or another opening of any suitable shape) through the sleeve body 110 from the inner radial side 116 to the outer radial side 118.

The sleeve body 110 is disposed within the housing body 98. The first axial end 112 is disposed at (e.g., on, adjacent, or proximate) the sleeve facing surface 108. The sleeve inlet 120 and the valve inlet 74 are axially coincident with the sleeve inlet 120 disposed at (e.g., on, adjacent, or proximate) the valve inlet 74. At least an axial portion of the outer radial side 118 is radially spaced from the inner radial side 104 to form an outer passage 124. The outer passage 124 extends circumferentially about (e.g., completely around) the valve axis 96 between (e.g., radially between) the sleeve body 110 and the housing body 98. The sleeve outlet 122 (or one of the sleeve outlets 122) may be axially and/or circumferentially aligned with the valve outlet 76, however, the present disclosure is not limited to this foregoing exemplary configuration of the regulating valve 66. The sleeve body 110 may form a centering ring 126 at (e.g., on, adjacent, or proximate) the second axial end 114. The centering ring 126 may be formed by a radially-enlarged portion of the sleeve body 110. The centering ring 126 may extend circumferentially about (e.g., completely around) the valve axis 96. The outer radial side 118 may contact the inner radial side 104 along the centering ring 126 to facilitate centering of the sleeve body 110 within the housing body 98 (e.g., relative to the valve axis 96). The sleeve body 110 forms one or more bleed holes 128 of the sleeve 80 extending (e.g., radially extending) through the sleeve body 110 between and to the inner radial side 116 and the outer radial side 118. The bleed holes 128 are connected in fluid communication with the outer passage 124 such that the outer passage 124 interconnects the bleed holes 128 in fluid communication with the valve outlet 76. The bleed holes 128 may be arranged circumferentially about the sleeve body 110. The bleed holes 128 may be disposed at (e.g., on, adjacent, or proximate) the centering ring 126. The sleeve body 110 forms a flange 130 on the second axial end 114. The flange 130 may be disposed at (e.g., on, adjacent, or proximate) and/or mounted to (e.g., by mechanical fasteners) the housing body 98 at (e.g., on, adjacent, or proximate) the second axial end 102.

The piston 82 includes a piston body 132. The piston body 132 is disposed within the sleeve body 110. The piston body 132 extends (e.g., axially extends) between and to a first axial end 134 of the piston body 132 and a second axial end 136 of the piston body 132. The piston body 132 includes a plug portion 138 and a side wall portion 140. The plug portion 138 is disposed at (e.g., on, adjacent, or proximate) the first axial end 134. The plug portion 138 forms a plug seat 142 extending circumferentially about (e.g., completely around) the valve axis 96. The plug seat 142 is disposed at (e.g., on, adjacent, or proximate) the sleeve inlet 120. The plug seat 142 and the inner radial side 116 at (e.g., on, adjacent, or proximate) the sleeve inlet 120 form a variable flow area 144 of the regulating valve 66 between the valve inlet 74 and the valve outlet 76. The sidewall portion 140 extends (e.g., axially extends) between and to the plug portion 138 and the second axial end 136. The sidewall portion 140 extends (e.g., radially extends) between and to an inner radial side 146 of the sidewall portion 140 and an outer radial side 148 of the sidewall portion 140. The inner radial side 146 and the outer radial side 148 extend circumferentially about (e.g., completely around) the valve axis 96. The inner radial side 146 surrounds and forms a piston cavity 150 of the piston 82. The outer radial side 148 is disposed at (e.g., on, adjacent, or proximate) the inner radial side 116. The piston body 132 may form one or more bleed grooves 152 (e.g., castellations) at (e.g., on, adjacent, or proximate) the second axial end 136. The bleed grooves 152 may extend (e.g., axially extend) through the piston body 132 from the second axial end 136 toward the first axial end 134. The bleed grooves 152 may be arranged circumferentially about the piston body 132. Each of the bleed grooves 152 may be circumferentially aligned with a respective one of the bleed holes 128. The piston body 132 is axially translatable within the sleeve body 110, between and to an open position (e.g., a fully open position) and a closed position (e.g., a fully closed position) to vary a size of the variable flow area 144. The piston body 132 may additionally be rotatable about the valve axis 96 within the sleeve body 110. The bleed grooves 152 facilitate fluid flow through the bleed holes 128, for example, with the piston body 132 in or substantially in the fully open position.

The plug portion 138 of FIG. 4 forms a plug cavity 154 and one or more bleed holes 156. The plug cavity 154 is disposed at (e.g., on, adjacent, or proximate) and connected in fluid communication with the piston cavity 150. The plug cavity 154 may extend (e.g., axially extend) through the plug portion 138 along the valve axis 96 from the piston cavity 150 toward the first axial end 134. Each of the bleed holes 156 extends (e.g., radially extends) through the plug portion 138 between and to the plug cavity 154 and the plug seat 142.

The spring disk 84 is disposed within the piston body 132. The spring disk 84 extends (e.g., axially extends) between and to a first axial end 158 of the spring disk 84 and a second axial end 160 of the spring disk 84. The first axial end 158 faces the first axial end 134 and further forms the piston cavity 150. The spring disk 84 includes a sidewall 162 extending (e.g., axially extending) between and to the first axial end 158 and the second axial end 160. The sidewall 162 extends circumferentially about (e.g., completely around) the valve axis 96. The sidewall 162 is disposed at (e.g., on, adjacent, or proximate) the inner radial side 146. The spring disk 84 is axially translatable within the piston body 132. Axial translation of the spring disk 84 within the piston body 132 may be limited by a retaining member 164 disposed axially between the spring disk 84 and the second axial end 136. The retaining member 164 may extend radially inward from the inner radial side 146. For example, the retaining member 164 may be a retaining ring which may be fixedly installed to the sidewall portion 140 at (e.g., on, adjacent, or proximate) the inner radial side 146 (e.g., within a groove formed by the sidewall portion 140). Accordingly, the spring disk 84 may be axially translatable between the retaining member 164 and the plug portion 138.

The outer cover 86 includes an outer cover body 166. The outer cover body 166 extends (e.g., axially extends) between and to a first axial end 168 of the outer cover body 166 and a second axial end 170 of the outer cover body 166. The outer cover body 166 forms an inner cavity 172 and a plunger aperture 174. The outer cover body 166 forms the inner cavity 172 on the second axial end 170. The outer cover body 166 extends circumferentially about (e.g., completely around) the inner cavity 172. The inner cavity 172 extends (e.g., axially extends) along the valve axis 96 through the outer cover body 166 from the second axial end 170 toward the first axial end 168. As shown in FIG. 5, the outer cover body 166 may form an anti-rotation mating interface 176 (e.g., a hex interface) circumscribing the inner cavity 172. The anti-rotation mating interface 176 may facilitate anti-rotation (e.g., about the valve axis 96) of the inner cover 88 relative to the outer cover 86. The present disclosure, however, is not limited to the foregoing exemplary anti-rotation mating interface 176 and anti-rotation between the inner cover 88 and the outer cover 86 may be accomplished using other non-circular patterns, asymmetrical patterns, or other suitable anti-rotation mating structures. The outer cover body 166 forms the plunger aperture 174 on the first axial end 168. The outer cover body 166 extends circumferentially about (e.g., completely around) the plunger aperture 174. The plunger aperture 174 extends (e.g., axially extends) along the valve axis 96 through the outer cover body 166 from the first axial end 168 to the inner cavity 172. The outer cover body 166 forms a threaded interface 178 circumscribing the plunger aperture 174. The outer cover body 166 forms a flange 180 between (e.g., axially between) the first axial end 168 and the second axial end 170. The flange 180 is configured to be mounted to or otherwise engaged with the flange 130 (e.g., by mechanical fasteners).

Figure 6:
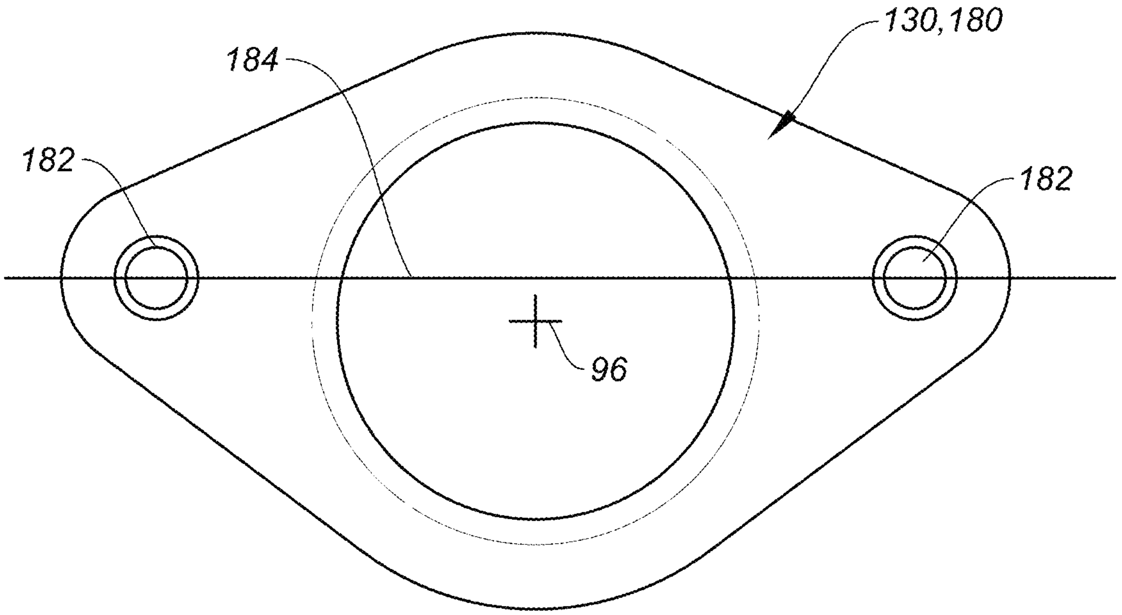
FIG. 6 illustrates a top view of a flange for the regulating valve, in accordance with one or more embodiments of the present disclosure.

Referring briefly to FIG. 6, the flange 130 and the flange 180 may each include fastener apertures 182 which are offset from the valve axis 96. For example, the fastener apertures 182 of the flanges 130, 180 may be positioned on a plane 184 (e.g., parallel to the valve axis 96 which is radially spaced from (e.g., does not intersect) the valve axis 96. The offset orientation of the fastener apertures 182 of the flange 130 and the flange 180 facilitates mistake-proof installation of the sleeve 80 ensuring alignment of the sleeve outlet 122 (or one of the sleeve outlets 122) with the valve outlet 76 (see FIG. 4).

Figure 7:
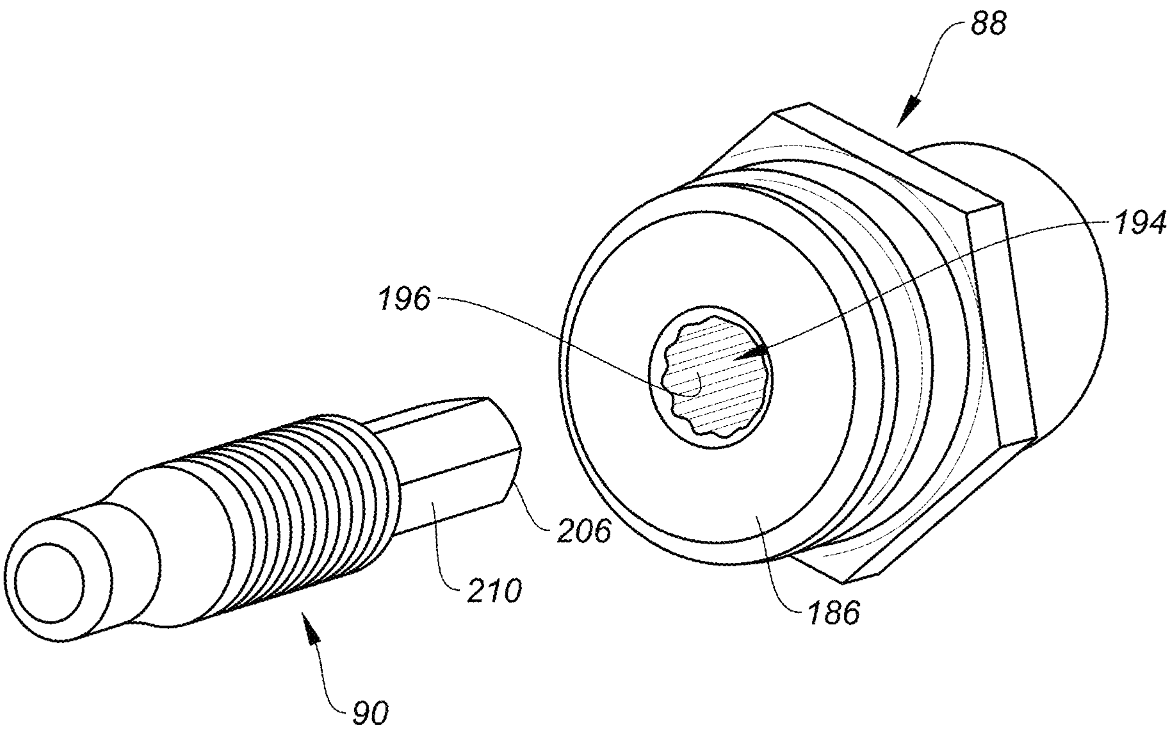
FIG. 7 illustrates an exploded view of components of the regulating valve, in accordance with one or more embodiments of the present disclosure.

The inner cover 88 includes an inner cover body 186. The inner cover body 186 extends (e.g., axially extends) between and to a first axial end 188 of the inner cover body 186 and a second axial end 190 of the inner cover body 186. The inner cover body 186 forms an anti-rotation mating interface 192 (e.g., a hex interface). The anti-rotation mating interface 192 may circumscribe the inner cover body 186 and extend circumferentially about (e.g., completely around) the valve axis 96. The inner cover body 186 forms a plunger aperture 194. The plunger aperture 194 extends (e.g., axially extends) through the inner cover body 186 along the valve axis 96 from the first axial end 188 toward the second axial end 190. The inner cover body 186 may form an anti-rotation mating interface 196 (e.g., a female interface) circumscribing the plunger aperture 194 as shown, for example, in FIG. 7. The anti-rotation mating interface 196 may facilitate anti-rotation (e.g., about the valve axis 96; see FIG. 4) of the plunger 90 relative to the inner cover 88. The present disclosure, however, is not limited to the foregoing anti-rotation mating interface 196 shape shown in FIG. 7 and anti-rotation between the plunger 90 and the inner cover 88 may be accomplished using other non-circular patterns, asymmetrical patterns, or other suitable anti-rotation mating structures. The inner cover body 186 is disposed within the outer cover body 166 (e.g., within the inner cavity 172). The inner cover body 186 may be positionally fixed relative to the outer cover body 166 by a retaining member 198. The retaining member 198 may extend radially inward from the outer cover body 166 and into the inner cavity 172 to radially overlap a portion of the inner cover body 186, thereby obstructing axial movement of the inner cover body 186 away from the outer cover body 166. The retaining member 198 of FIG. 4 includes a retaining ring 200 and a washer 202. The retaining ring 200 may be fixedly installed to the outer cover body 166 (e.g., within a groove formed by the outer cover body 166). The retaining ring 200 may, therefore, retain the washer 202 in contact with the inner cover body 186 to prevent unintended separation of the inner cover body 186 from the outer cover body 166. The present disclosure, however, is not limited to the foregoing exemplary configuration of the retaining member 198 illustrated in FIG. 4 and described above. With the inner cover body 186 installed in the outer cover body 166, the anti-rotation mating interface 192 is engaged with the anti-rotation mating interface 176 and the plunger aperture 194 is aligned with the plunger aperture 174 along the valve axis 96. The inner cover body 186 may additionally include a threaded aperture 203 on the second axial end 190. The threaded aperture 203 may facilitate threaded mating of the inner cover body 186 to a tool, a mechanical fastener, or the like to facilitate installation and/or removal of the inner cover body 186 relative to the outer cover body 166.

The plunger 90 extends (e.g., axially extends) between and to a first axial end 204 of the plunger 90 and a second axial end 206 of the plunger 90. The plunger 90 includes an outer radial side 207 extending between and to the first axial end 204 and the second axial end 206. The outer radial side 207 extends circumferentially about (e.g., completely around) the valve axis 96. The plunger 90 forms a threaded interface 208 on the outer radial side 207. The threaded interface 208 is disposed between (e.g., axially between) the first axial end 204 and the second axial end 206. The threaded interface 208 circumscribes the plunger 90 and extends circumferentially about (e.g., completely around) the valve axis 96. The plunger 90 may form an anti-rotation mating interface 210 (e.g., a male hex interface) at (e.g., on, adjacent, or proximate) the second axial end 206 as shown, for example, in FIG. 7. The anti-rotation mating interface 210 may circumscribe the plunger 90 and extend circumferentially about (e.g., completely around) the valve axis 96. The anti-rotation mating interface 210 is configured to securely mate with (e.g., engage) the anti-rotation mating interface 196.

The plunger 90 is installed on the outer cover body 166 and the inner cover body 186. The plunger 90 extends along the valve axis 96 within the plunger aperture 174 and the plunger aperture 194. The first axial end 204 is disposed between (e.g., axially between) the spring disk 84 and the outer cover body 166. The threaded interface 208 is engaged with the threaded interface 178. The threaded engagement between the threaded interface 208 and the threaded interface 178 facilitates adjustment of the axial position of the plunger 90 (e.g., the first axial end 204), for example, relative to the spring disk 84. In other words, the plunger 90 may be rotated relative to the outer cover body 166 to adjust an axial position of the plunger by the threaded engagement between the threaded interface 208 and the threaded interface 178. Outside of this adjustment of the plunger 90, the axial position of the plunger 90 within the regulating valve 66 is typically fixed (e.g., with the inner cover body 186 engaged with the plunger 90). The second axial end 206 is disposed within the inner cover body 186. The anti-rotation mating interface 210 may be engaged with the anti-rotation mating interface 196 with the inner cover body 186 installed on the outer cover body 166. The engagement between the anti-rotation mating interface 210 and the anti-rotation mating interface 196 facilitates anti-rotation (e.g., about the valve axis 96) of the plunger 90, thereby preventing or reducing a likelihood of unintended axial movement of the plunger 90 within the regulating valve.

The sleeve body 110, the piston body 132, the spring disk 84, the outer cover body 166, and the plunger 90 form a sleeve cavity 212. The sleeve body 110 extends circumferentially about (e.g., completely around) the sleeve cavity 212. The first axial end 204 is disposed within the sleeve cavity 212. The sleeve cavity 212 is connected in fluid communication with the outer passage 124 by the bleed holes 128.

The check valve spring 92 (e.g., a coil spring, a wave spring, Bellville washers, or the like) is disposed within the sleeve cavity 212. The check valve spring 92 extends (e.g., axially extends) between and to the spring disk 84 (e.g., the second axial end 160) and the outer cover body 166, for example, at (e.g., on, adjacent, or proximate) the first axial end 168. The check valve spring 92 biases the spring disk 84, the cold-start spring 94, and the piston body 132 away from the outer cover body 166, for example, in an axial direction toward the plug portion 138. The check valve spring 92 extends circumferentially about (e.g., completely around) the valve axis 96 and the plunger 90. The check valve spring 92 is disposed radially within the sleeve body 110 and the piston body 132 (e.g., the sidewall portion 140).

The cold-start spring 94 (e.g., a coil spring, a wave spring, Belleville washers, or the like) is disposed within the piston cavity 150. The cold-start spring 94 extends (e.g., axially extends) between and to the spring disk 84 (e.g., the first axial end 158) and the plug portion 138. The cold-start spring 94 biases the spring disk 84 toward the outer cover body 166, for example, in an axial direction away from the plug portion 138. The cold-start spring 94 extends circumferentially about (e.g., completely around) the valve axis 96. The cold-start spring 94 is disposed radially within the piston body 132 (e.g., the sidewall portion 140). The cold-start spring 94 has a greater stiffness than the check valve spring 92. In other words, the cold-start spring 94 has a spring constant which is greater than a spring constant of the check valve spring 92.

Referring to FIGS. 3 and 8A-C, during operation of the oil system 34, the oil pump 58 draws oil from the oil tank 64 and directs (e.g., pumps) the oil to the oil loads of the gas turbine engine 22, as discussed above. The regulating valve 66 facilitates regulation of oil pressure at (e.g., on, adjacent, or proximate) the pump outlet 72 (e.g., downstream of the pump outlet 72) by selectively varying a flow rate of oil directed through the regulating valve 66 to the pump inlet 70 (e.g., upstream of the pump inlet 70). The regulating valve 66 additionally facilitates continued operation of the oil system 34 under operational scenarios in which a substantial quantity of air is present (e.g., entrained with) the oil pumped by the oil pump 58, as well as purging of this air from the oil system 34. Such operational scenarios may occur, for example, at an initial oil system 34 start after the oil system 34 is purged and refilled with oil or during flight conditions due to oil pump 58 air ingestion caused by aircraft maneuvers. The presence of a substantial quantity of air in the oil system 34 may prevent the oil pump 58 from pressurizing the oil system 34 or otherwise negatively impacting oil system 34 performance.

Figure 8C:
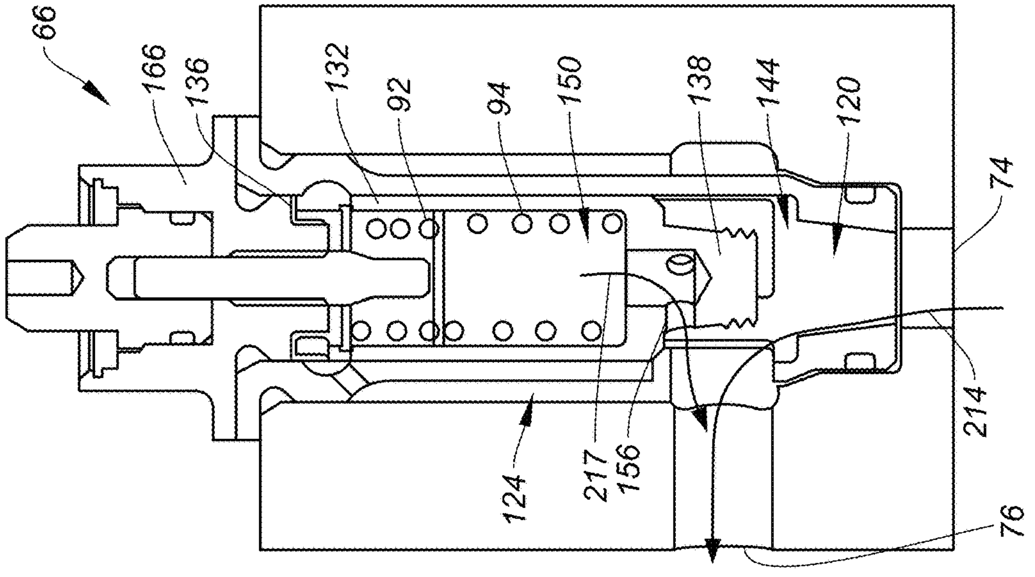
FIGS. 8A-C illustrate various open and closed positions of a piston of the regulating valve, in accordance with one or more embodiments of the present disclosure.
Figure 8B:
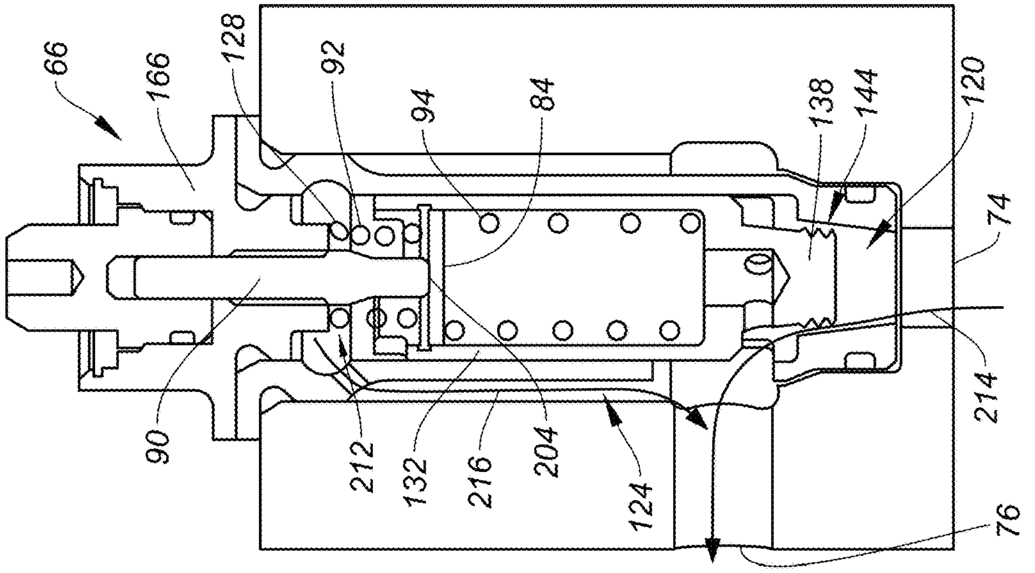
Figure 8A:
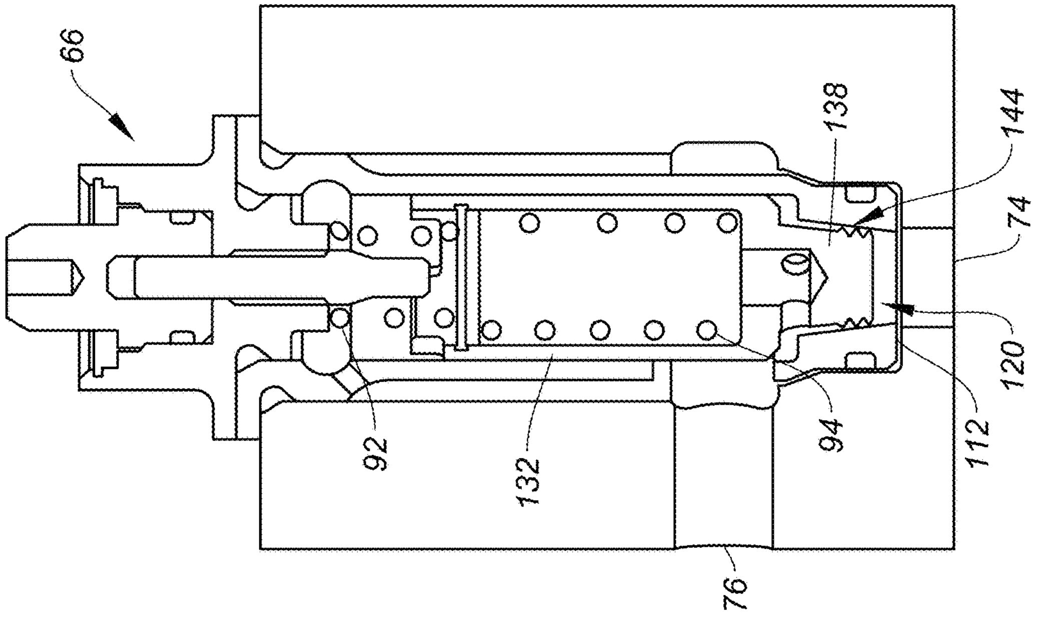

FIG. 8A illustrates the regulating valve 66 with the piston body 132 in the closed position (e.g., the fully closed position) such that no or substantially no oil flows through the regulating valve 66 from the valve inlet 74 to the valve outlet 76. In this closed position of the piston body 132, the spring force of the check valve spring 92 and the cold start spring 94 exceeds a force difference between the oil in fluid communication with the sleeve cavity 212 (e.g., within the sleeve inlet 120) and the oil within the valve outlet 76, thereby biasing the assembly of the piston body 132, the spring disk 84, the cold start spring 94, and the restraining member 164 toward the first axial end 112 to close or substantially close the variable flow area 144 with the plug portion 138. For example, the presence of a substantial quantity of air within the oil of the oil system 34 may result in a rapid and significant drop in oil pressure in the oil system 34, thereby causing the check valve spring 92 to bias the piston body 132 in the closed position. In this closed position, the oil pump 58 directs all or substantially all oil flow to oil to the oil loads of the gas turbine engine 22 (e.g., and not through the regulating valve 66) purging the air from the oil until oil pressure within the oil system 34 begins to increase again.

FIG. 8B illustrates the regulating valve 66 with the piston body 132 in a partially-open position, such that some oil flows through the regulating valve 66, from the valve inlet 74 to the valve outlet 76, along an oil flow path 214. In this partially-open position, the force difference between the oil in fluid communication with the sleeve cavity 212 (e.g., within the sleeve inlet 120) primarily compresses the check valve spring 92 (e.g., due to the greater stiffness of the cold start spring 94 relative to the check valve spring 92) causing the piston body 132 and its plug portion 138 to axially translate away from the sleeve inlet 120, thereby increasing a size of the variable flow area 144 to regulate (e.g., control) oil pressure at (e.g., on, adjacent, or proximate) the pump outlet 72. As the oil pressure difference between the sleeve inlet 120 and the sleeve outlet 122 (e.g., in fluid communication with the sleeve cavity 212 through the outer passage 124 and the bleed holes 128) increases, the check valve spring 92 may become increasingly compressed between the spring disk 84 and the outer cover body 166 until the spring disk 84 contacts the plunger 90 (e.g., the first axial end 204). As the check valve spring 92 becomes increasingly compressed, a volume of the sleeve cavity 212 may decrease, thereby directing oil out of the sleeve cavity 212 along a bleed flow path 216 through the bleed holes 128 to the outer passage 124 and, subsequently, the valve outlet 76.

FIG. 8C illustrates the regulating valve 66 with the piston body 132 in an open (e.g., fully open) position, such that a greater amount of oil flows through the regulating valve 66, from the valve inlet 74 to the valve outlet 76, along the oil flow path 214 (e.g., relative to the piston body 132 position of FIG. 8B). In this open position, the piston body 132 (e.g., the second axial end 136) may contact the outer cover body 166 which contact may limit further axial translation of the piston body 132 away from the valve inlet 74. Under some high-pressure operating conditions of the oil system 34, such as during a cold start of the oil system 34 when the oil in the oil system 34 is highly viscous, the force difference applied to the piston body 132 by oil within the sleeve inlet 120 and the piston cavity 150 compresses the cold start spring 94 causing the piston body 132 and its plug portion 138 to further axially translate away from the sleeve inlet 120, thereby increasing a size of the variable flow area 144 to regulate (e.g., control) oil pressure at (e.g., on, adjacent, or proximate) the pump outlet 72. As the cold start spring 94 becomes increasingly compressed, a volume of the piston cavity 150 may decrease, thereby directing oil out of the piston cavity 150 along a bleed flow path 217 through the bleed holes 156 to the outer passage 124 and, subsequently, the valve outlet 76.

Figure 9:
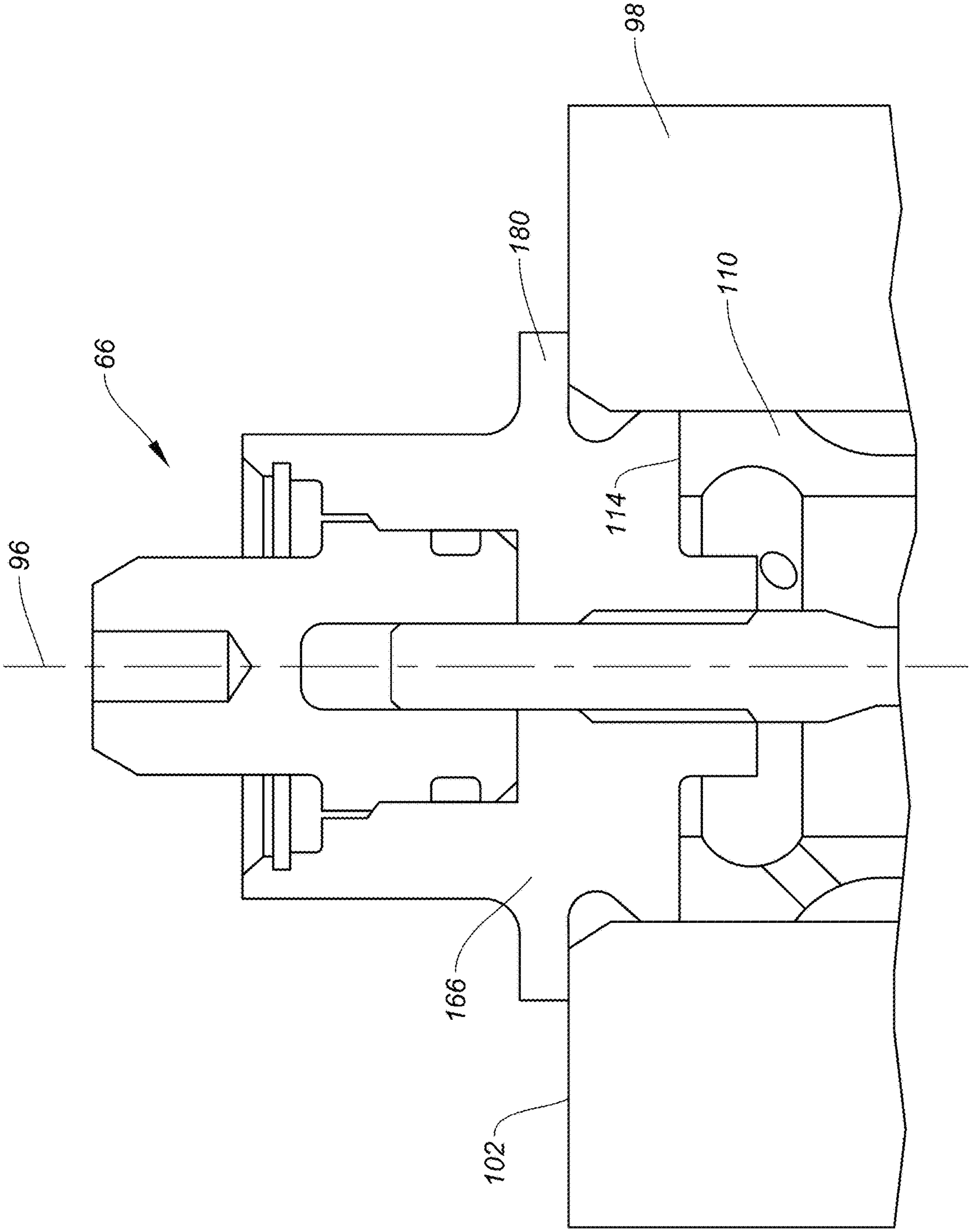
FIG. 9 illustrates a cutaway, side view of a portion of another regulating valve for an oil system, in accordance with one or more embodiments of the present disclosure.

Referring to FIG. 9, in some embodiments of the regulating valve 66, the sleeve body 110 may not include the flange 130 (see FIG. 4). The sleeve body 110 of FIG. 9 is entirely axially positioned within the housing body 98. For example, the second axial end 114 is disposed at (e.g., on, adjacent, or proximate) the outer cover body 166 within (e.g., axially within) the housing body 98. The flange 180 of FIG. 9 is disposed at (e.g., on, adjacent, or proximate) and/or mounted to (e.g., by mechanical fasteners) the housing body 98 at (e.g., on, adjacent, or proximate) the second axial end 102.

Figure 10:
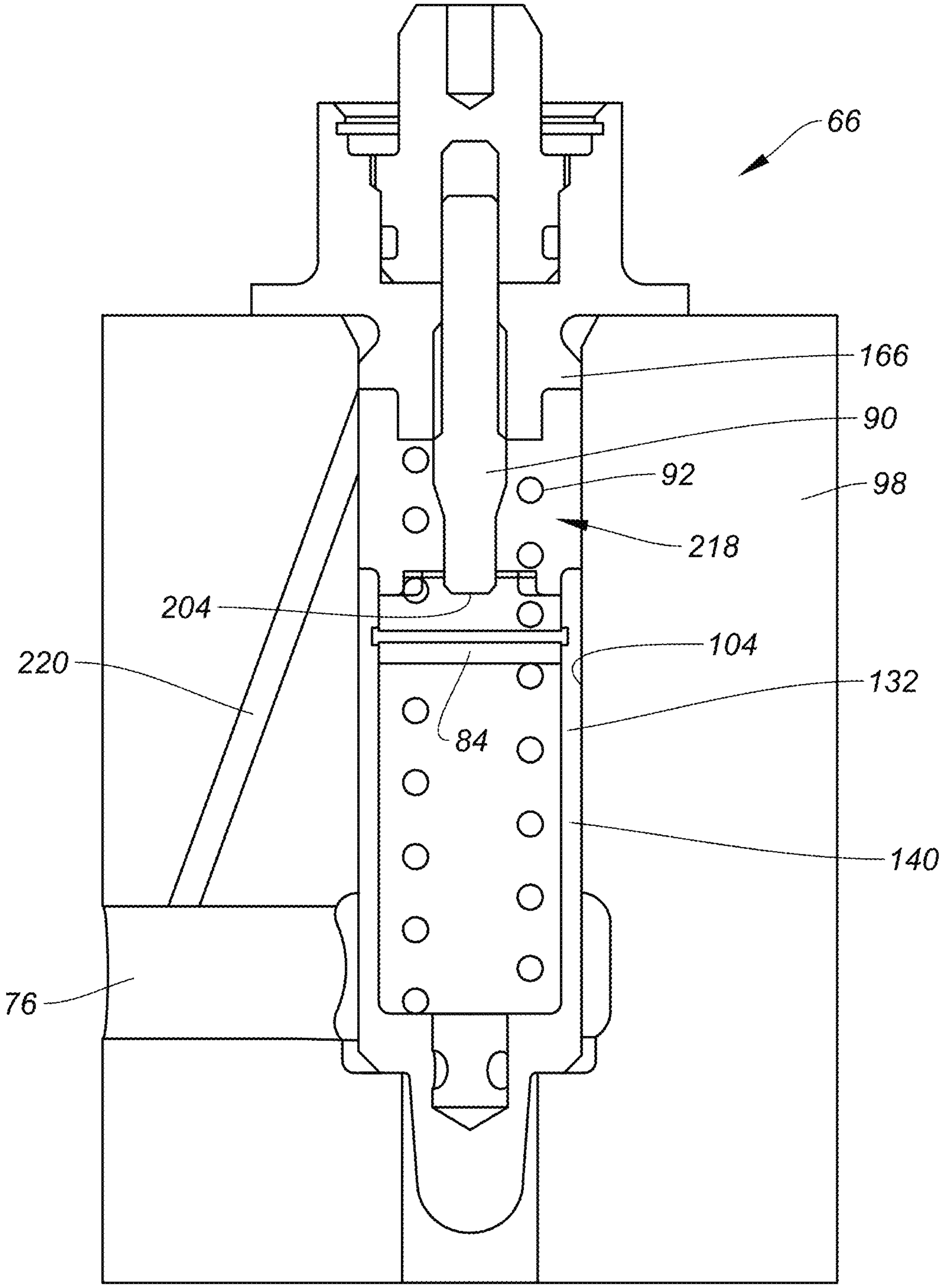
FIG. 10 illustrates a cutaway, side view of a portion of another regulating valve for an oil system, in accordance with one or more embodiments of the present disclosure.

Referring to FIG. 10, in some embodiments of the regulating valve 66, the regulating valve 66 may not include the sleeve 80 (see FIG. 4). The piston body 132 of FIG. 10 is positioned within the housing body 98. The sidewall portion 140 is disposed in contact with or in close proximity to the housing body 98 such that the piston body 132 may axially translate along and/or in contact with the housing body 98 (e.g., the inner radial side 104) between the open position and the closed position. The housing body 98, the piston body 132, the spring disk 84, the outer cover body 166, and the plunger 90 form a housing cavity 218. The housing body 98 extends circumferentially about (e.g., completely around) the housing cavity 218. The first axial end 204 is disposed within the housing cavity 218. The check valve spring 92 is disposed within the housing cavity 218 extending between and contacting the spring disk 84 and the outer cover body 166. The housing body 98 may further form one or more bleed lines 220 connecting the housing cavity 218 in fluid communication with the valve outlet 76. For example, the bleed lines 220 may extend through the housing body 98 between and to the housing cavity 218 and the valve outlet 76.

Figure 11B:
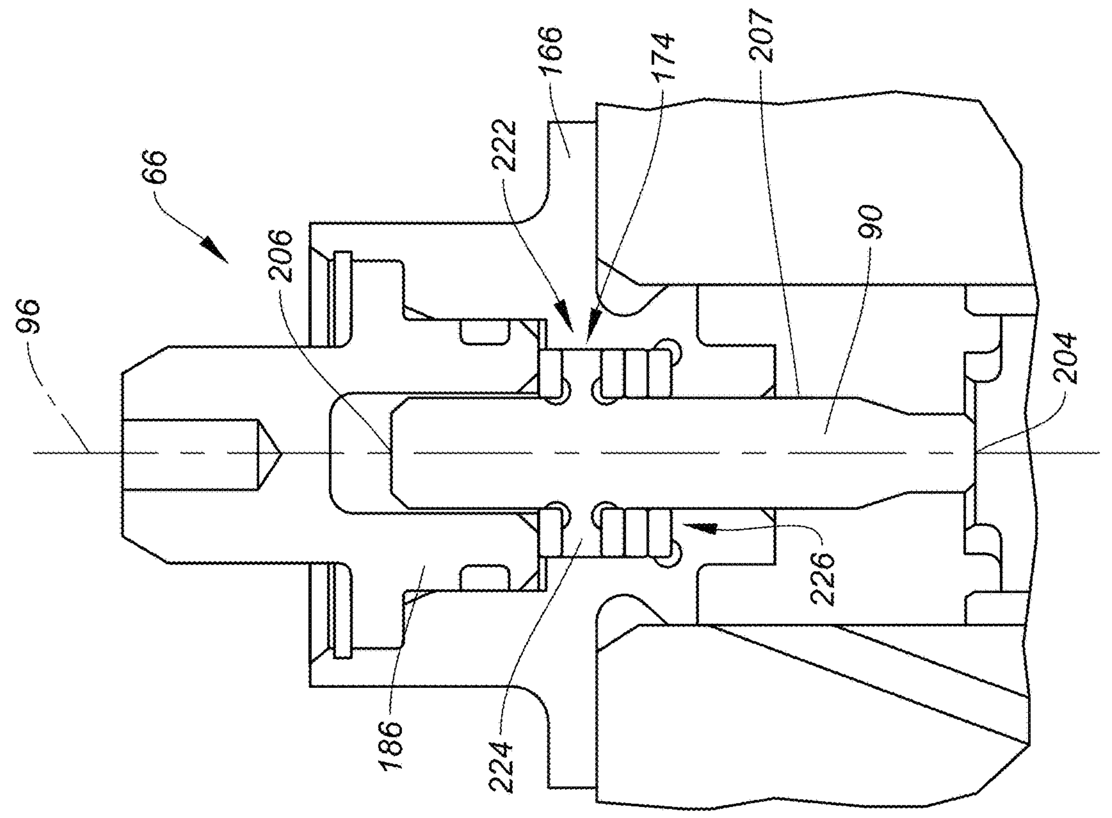
FIGS. 11A-B illustrate a cutaway, side views of a portion of another regulating valve for an oil system, in accordance with one or more embodiments of the present disclosure.
Figure 11A:
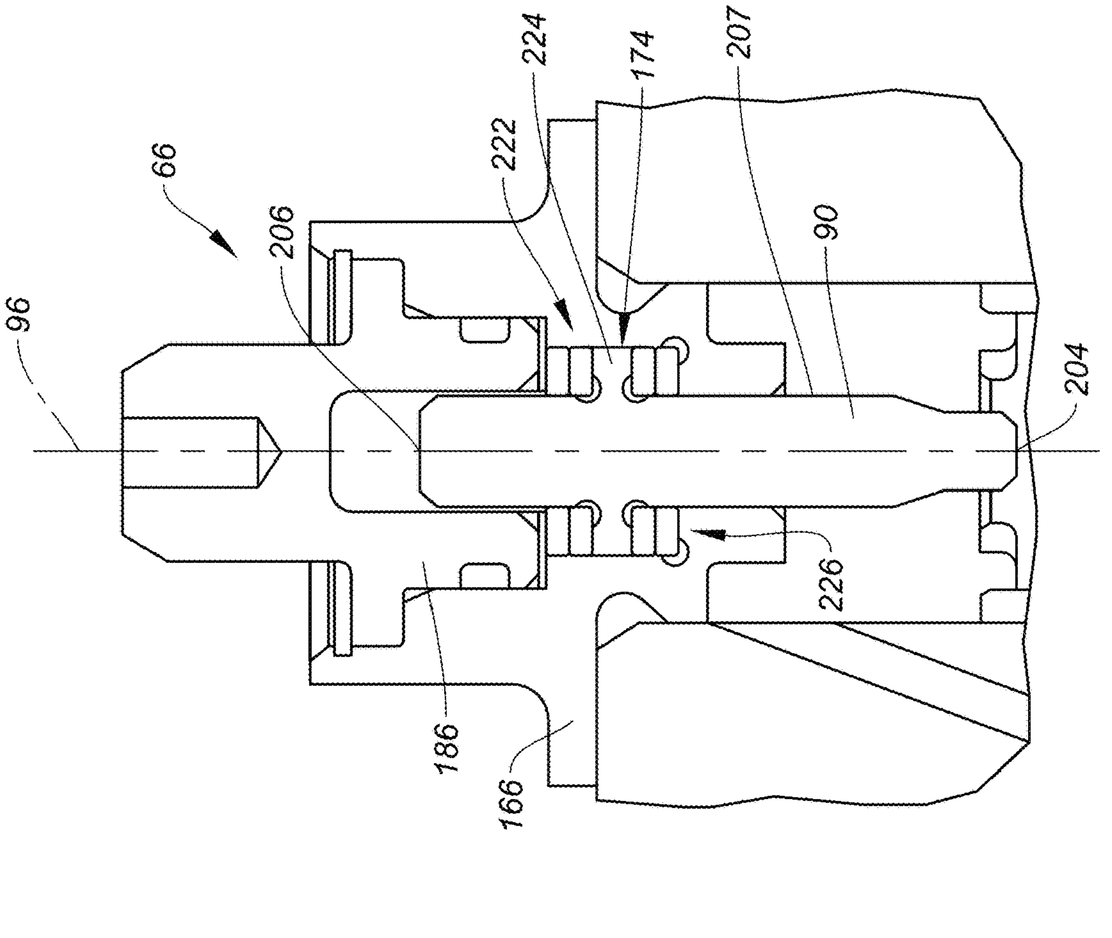

Referring to FIGS. 11A and 11B, in some embodiments, the regulating valve 66 may include a positioning assembly 222 for axially positioning the plunger 90 within the regulating valve 66. The positioning assembly 222 of FIGS. 11A and 11B includes positioning member 224, formed by the plunger 90, and a plurality of adjustment washers 226. The positioning member 224 and the adjustment washers 226 are disposed within the plunger aperture 174 of the outer cover 166. The positioning member 224 is disposed between (e.g., axially between) the first axial end 204 and the second axial end 206. The positioning member 224 projects radially outward from the outer radial side 207. The positioning member 224 may be configured as a ring extending circumferentially about (e.g., completely around) the valve axis 96. The adjustment washers 226 are positioned on the plunger 90 extending circumferentially about (e.g., completely around) the outer radial side 207. The adjustment washers 226 are selectively arranged axially along the plunger 90 to axially position the plunger 90 relative to the outer cover body 166. For example, a quantity of the adjustment washers 226 on a first axial side of the positioning member 224 and a quantity of the adjustment washers 226 on an opposing second axial side of the positioning member 224 to position the plunger 90 (e.g., the first axial end 204) at a desired axial position within the regulating valve 66, as shown in FIGS. 11A and 11B. The positioning member 224 and the adjustment washers 226 are securely positioned (e.g., sandwiched) axially between the outer cover body 166 and the inner cover body 186.

Figure 12:
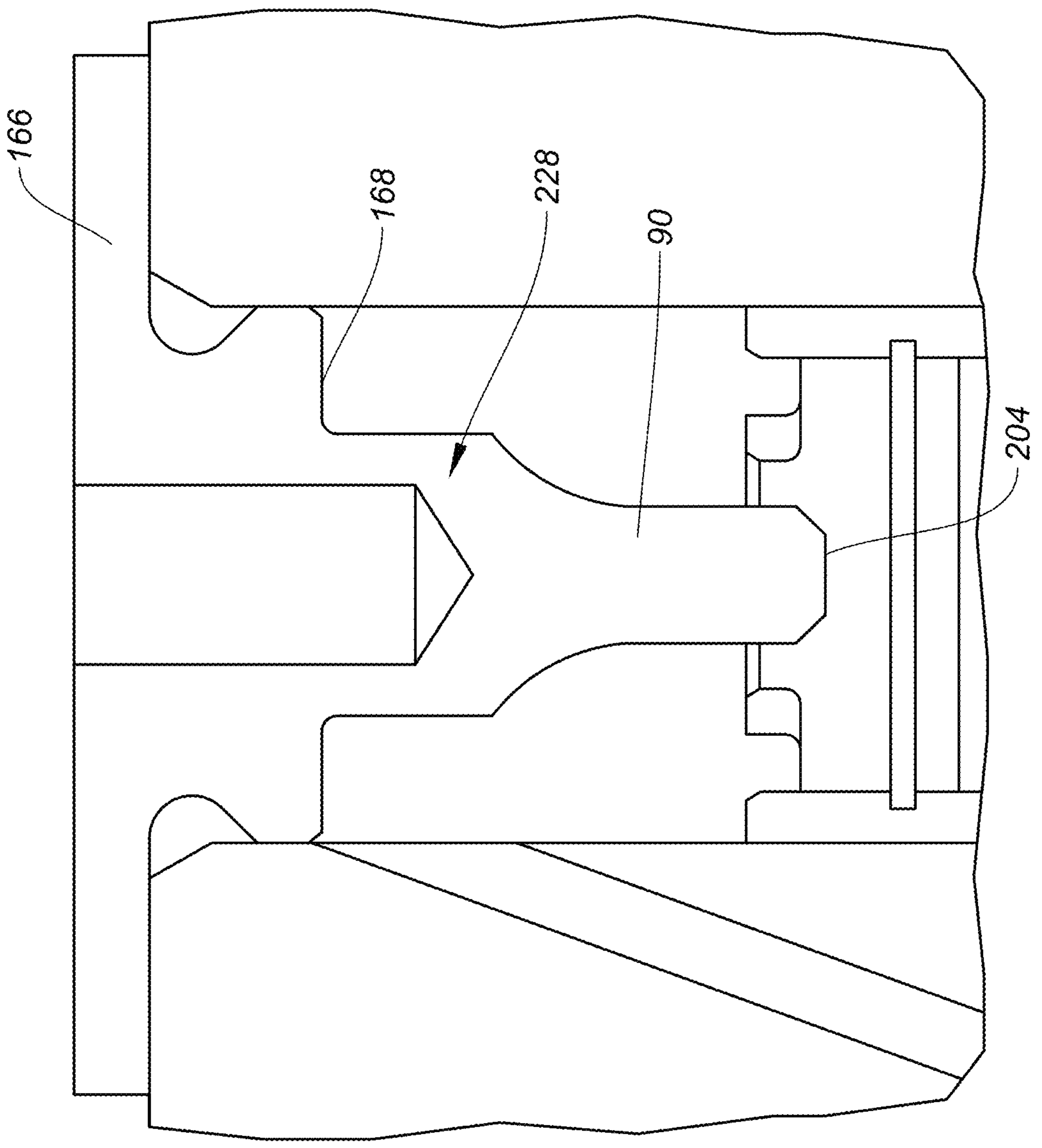
FIG. 12 illustrates a cutaway, side view of a portion of another regulating valve for an oil system, in accordance with one or more embodiments of the present disclosure.

Referring to FIG. 12, in some embodiments, the outer cover body 166 and the plunger 90 of the regulating valve 66 may collectively form a unitary component 228. The term "unitary component" as used herein means a single component, wherein the outer cover body 166 and the plunger 90 are an inseparable body (e.g., formed of a single material), or a weldment of independent elements. Where the outer cover body 166 and the plunger 90 form the unitary component 228, the function of the inner cover 88 (see FIG. 4) for securely retaining the plunger 90 may be obviated. Accordingly, the regulating valve 66 may not include the inner cover 88. The plunger 90 extends (e.g., axially extends) from the outer cover body 166 (e.g., the first axial end 168) to the first axial end 204. The unitary configuration of the outer cover body 166 and the plunger 90 may facilitate simplified construction (e.g., reduced part count) and assembly of the regulating valve 66 while also preventing unintended axial movement of the plunger 90. In this unitary configuration, the axial position of the plunger 90 relative to the outer cover body 166 may not be adjusted. Accordingly, selecting the axial position of the plunger 90 (e.g., first axial end 204) may be accomplished using interchangeable unitary component 228 of the outer cover body 166 and the plunger 90 having varying plunger 90 axial lengths.

Figure 13:
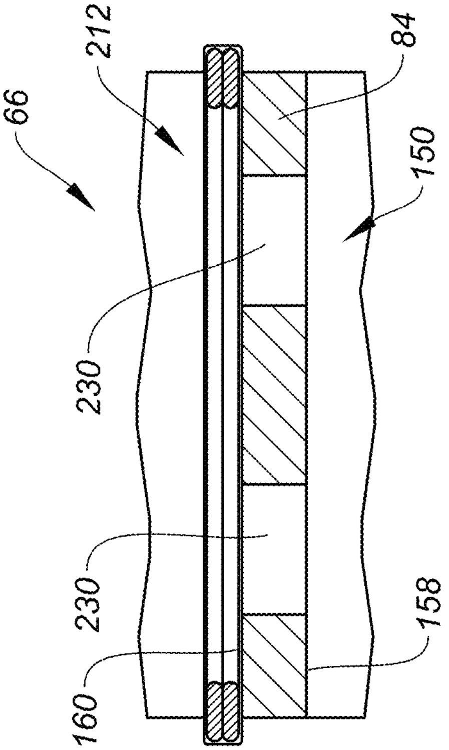
FIG. 13 illustrates a cutaway, side view of a portion of another regulating valve for an oil system, in accordance with one or more embodiments of the present disclosure.

Referring to FIG. 13, in some embodiments of the regulating valve 66, the spring disk 84 may form one or more bleed holes 230 extending (e.g., axially extending) through the spring disk 84 between and to the first axial end 158 and the second axial end 160. The bleed holes 230 may facilitate equalizing oil pressure between the piston cavity 150 and the sleeve cavity 212.

Figure 14:
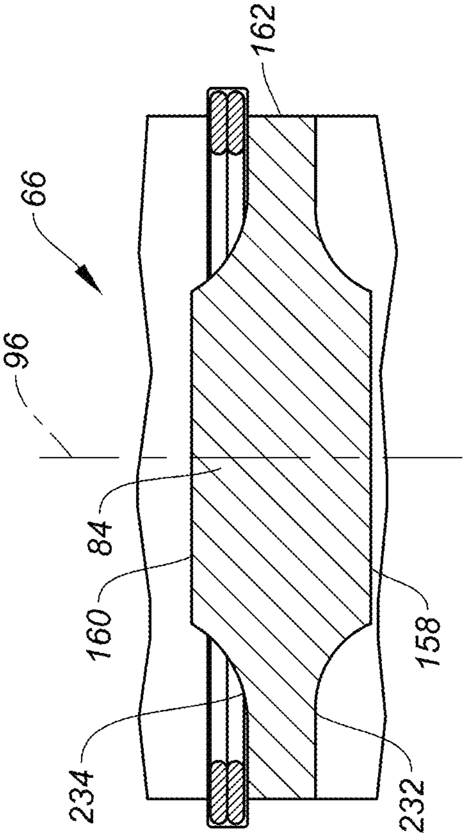
FIG. 14 illustrates a cutaway, side view of a portion of another regulating valve for an oil system, in accordance with one or more embodiments of the present disclosure.

Referring to FIG. 14, in some embodiments of the regulating valve 66, the spring disk 84 may have a non-uniform thickness extending between and to the first axial end 158 and the second axial end 160. For example, the spring disk 84 may form one or both of a first annular groove 232 and a second annular groove 234. The first annular groove 232 and the second annular groove 234 may extend circumferentially about (e.g., completely around) the valve axis 96. The first annular groove 232 may be disposed on the first axial end 158 and the sidewall 162. The second annular groove 234 may be disposed on the second axial end 160 and the sidewall 162. The non-uniform thickness of the spring disk 84 (e.g., the first annular groove 232 and/or the second annular groove 234) may facilitate increased stiffness of the spring disk 84. Moreover, the first annular groove 232 may facilitate more secure positioning and guidance of the cold start spring 94 contacting the spring disk 84 within the first annular groove 232 (see FIG. 4). Similarly, the second annular groove 234 may facilitate more secure positioning and guidance of the check valve spring 92 contacting the spring disk 84 within the second annular groove 234 (see FIG. 4).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A regulating valve for an oil system of a gas turbine engine, the regulating valve comprising:

a housing forming a valve inlet and a valve outlet, the valve inlet extending axially through the housing along a valve axis of the regulating valve, the valve outlet extending radially through the housing;

a piston disposed within the housing, the piston including a plug portion and a piston sidewall portion, the plug portion disposed on the valve axis at the valve inlet, the piston sidewall portion extending circumferentially about the valve axis, the piston sidewall portion including an inner radial piston side surrounding and forming a first cavity;

a spring disk disposed at the inner radial piston side, the spring disk extending between and to a first axial disk end and a second axial disk end, the first axial disk end further forming the first cavity;

an outer cover forming a second cavity axially between the outer cover and the second axial disk end;

a plunger disposed at the outer cover, the plunger extending along the valve axis between and to a first axial plunger end and a second axial plunger end, the first axial plunger end disposed within the second cavity;

a first spring disposed within the first cavity, the first spring extending axially between and contacting the first axial disk end and the plug portion; and a second spring disposed within the second cavity, the second spring extending axially between and contacting the second axial disk end and the outer cover.

2. The regulating valve of claim 1, wherein the plug portion forms one or more bleed holes, and the one or more bleed holes connect the first cavity in fluid communication with the valve outlet.

3. The regulating valve of claim 1, wherein the housing forms a bleed line extending between and to the second cavity and the valve outlet, the bleed line connecting the second cavity in fluid communication with the valve outlet.

4. The regulating valve of claim 1, wherein the housing includes an inner radial housing side extending circumferentially about the valve axis, and the piston sidewall portion is disposed at the inner radial housing side.

5. The regulating valve of claim 1, wherein the spring disk is axially translatable relative to piston.

6. The regulating valve of claim 1, wherein the outer cover forms a first plunger aperture extending through the outer cover along the valve axis, the outer cover forms a first threaded interface circumscribing the first plunger aperture, the plunger forms a second threaded interface, and the first threaded interface is engaged with the second threaded interface.

7. The regulating valve of claim 1, wherein the outer cover and the plunger form a unitary component.

8. The regulating valve of claim 1, wherein the spring disk forms one or more bleed holes extending through the spring disk from the first axial disk end to the second axial disk end, and the one or more bleed holes connect the first cavity and the second cavity in fluid communication.

9. The regulating valve of claim 1, wherein the spring disk has a non-uniform thickness extending between and to the first axial disk end and the second axial disk end.

10. The regulating valve of claim 9, wherein the spring disk forms a first annular groove at the first axial disk end and a second annular groove at the second axial disk end.

11. The regulating valve of claim 1, wherein the first spring has a greater spring stiffness than the second spring.

12. The regulating valve of claim 1, further comprising a sleeve extending between and to a first axial sleeve end and a second axial sleeve end, the sleeve includes an inner radial sleeve side and an outer radial sleeve side, the inner radial sleeve side and the outer radial sleeve side extend circumferentially about the valve axis, the sleeve forms a sleeve inlet through the first axial sleeve end at the valve inlet, the sleeve forms a sleeve outlet extending through the inner radial side and the outer radial side at the valve outlet, the inner radial sleeve side further forms the second cavity, and the piston is disposed within the sleeve with the plug portion disposed at the sleeve inlet.

13. The regulating valve of claim 12, wherein the sleeve forms one or more bleed holes extending through the sleeve from the inner radial sleeve side to the outer radial sleeve side, and the one or more bleed holes connect the second cavity and the valve outlet in fluid communication.

14. The regulating valve of claim 12, wherein the sleeve forms a first flange at the second axial sleeve end, the outer cover forms a second flange mounted to the first flange, and the first flange and the second flange are mounted to the housing.

15. The regulating valve of claim 14, wherein each of the first flange and the second flange include a first fastener aperture and a second fastener aperture, and the first fastener aperture and the second fastener aperture are positioned on a plane offset from the valve axis.

16. The regulating valve of claim 1, further comprising an inner cover mounted within the outer cover, the inner cover forms a plunger aperture, the inner cover forms a first anti-rotation mating interface at the plunger aperture, the second axial plunger end is disposed within the inner cover, the plunger forms a second anti-rotation mating interface, and the first anti-rotation mating interface is engaged with the second anti-rotation mating interface.

17. The regulating valve of claim 16, wherein the outer cover forms a first anti-rotation mating interface, the inner cover forms a second anti-rotation mating interface, and the first anti-rotation mating interface is engaged with the second anti-rotation mating interface.

18. The regulating valve of claim 16, further comprising a positioning assembly, the positioning assembly includes a positioning member and a plurality of adjustment washers, the plunger forms the positioning member, the plurality of adjustments washers includes at least one first adjustment washer on a first axial side of the positioning member and at least one second adjustment washer on a second axial side of the positioning member, and the positioning member and the plurality of adjustment washers are axially positioned between the outer cover and the inner cover.

19. A regulating valve for an oil system of a gas turbine engine, the regulating valve comprising:

a housing forming a valve inlet and a valve outlet;

a piston disposed within the housing, the piston including a plug portion and a piston sidewall portion, the plug portion disposed on a valve axis of the regulating valve at the valve inlet, the piston sidewall portion extending circumferentially about the valve axis, the piston sidewall portion including an inner radial piston side surrounding and forming a first cavity;

a spring disk disposed at the inner radial piston side, the spring disk extending between and to a first axial disk end and a second axial disk end, the first axial disk end further forming the first cavity, and the spring disk is axially translatable relative to piston;

an outer cover forming a second cavity axially between the outer cover and the second axial disk end;

a plunger connected to the outer cover, and the plunger is disposed within the second cavity;

a first spring disposed within the first cavity, the first spring extending axially between and contacts the first axial disk end and the plug portion; and a second spring disposed within the second cavity, the second spring extending axially between and contacting the second axial disk end and the outer cover; and the piston is positionable in a first axial position, a second axial position, and a third axial position within the housing to sequentially increase a variable flow area at the valve inlet, in the first axial position the plug portion obstructs oil flow from the valve inlet to the valve outlet and the spring disk is axially spaced from the plunger, in the second axial position the spring disk contacts the plunger, and in the third axial position the piston contacts the outer cover.

20. An oil system for a gas turbine engine, the oil system comprising:

an oil pump including a pump inlet and a pump outlet; and a regulating valve including a valve inlet and a valve outlet, the valve inlet connected in fluid communication with the oil pump at the pump outlet, and the valve outlet connected in fluid communication with the oil pump at the pump inlet, the regulating valve extending along a valve axis, the regulating valve including:

a housing forming the valve inlet and the valve outlet;

a piston disposed within the housing, the piston including a plug portion and a piston sidewall portion, the plug portion disposed at the valve inlet, the piston sidewall portion extending circumferentially about the valve axis, the piston sidewall portion including an inner radial piston side surrounding and forming a first cavity;

a spring disk disposed at the inner radial piston side, the spring disk extending between and to a first axial disk end and a second axial disk end, the first axial disk end further forming the first cavity;

an outer cover forming a second cavity axially between the outer cover and the second axial disk end;

a plunger disposed at the outer cover, the plunger extending along the valve axis between and to a first axial plunger end and a second axial plunger end, the first axial plunger end disposed within the second cavity;

a first spring disposed within the first cavity, the first spring extending axially between and contacting the first axial disk end and the plug portion; and a second spring disposed within the second cavity, the second spring extending axially between and contacting the second axial disk end and the outer cover.

* * * * *